United States Patent
Kranitzky et al.

(10) Patent No.: US 7,309,972 B2
(45) Date of Patent: Dec. 18, 2007

(54) METHOD FOR DETERMINING THE ROTOR POSITION OF A SYNCHRONOUS MOTOR

(75) Inventors: Walter Kranitzky, Traunstein (DE); Gerhard Quentel, Seebach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 409 days.

(21) Appl. No.: 10/510,925

(22) PCT Filed: Mar. 26, 2003

(86) PCT No.: PCT/EP03/03107

§ 371 (c)(1),
(2), (4) Date: Mar. 23, 2005

(87) PCT Pub. No.: WO03/085817

PCT Pub. Date: Oct. 16, 2003

(65) Prior Publication Data

US 2005/0174104 A1    Aug. 11, 2005

(30) Foreign Application Priority Data

Apr. 8, 2002   (DE) ................................ 102 15 428

(51) Int. Cl.
*H02P 21/00* (2006.01)
(52) U.S. Cl. ................ 318/721; 318/700; 318/661
(58) Field of Classification Search ............. 318/700
See application file for complete search history.

(56) References Cited

U.S. PATENT DOCUMENTS 5,874,821 A    2/1999  Monleone
6,011,368 A    1/2000  Kalpathi et al.
6,445,154 B1   9/2002  Toyozawa et al.

FOREIGN PATENT DOCUMENTS

| DE | 44 07 390  | 9/1995  |
| DE | 44 37 793  | 5/1998  |
| DE | 199 56 104 | 10/2000 |
| EP | 1 085 650  | 3/2001  |

OTHER PUBLICATIONS

"A Procedure to Estimate the Absolute Position of the Rotor Flux of a Permanent Magnet Synchronous Machine" from the European Conference on Power Electronics & Applications, 1991, Backhaus; Reinold; Kalker.*

* cited by examiner

*Primary Examiner*—Lincoln Donovan
*Assistant Examiner*—Michael Brandt
(74) *Attorney, Agent, or Firm*—Kenyon & Kenyon LLP

(57) ABSTRACT

The rotor position of a synchronous motor is determined, in that for a plurality of current vectors distributed over one electrical rotation of the synchronous motor, the amount of the current vector which is necessary to attain a defined deflection of the rotor is determined. The position of the rotor may be calculated from the position of the minima of the amounts thus determined, taking into account the direction of rotation of the rotor. The engagement of a brake may ensure that grooving forces and machine vibrations play no role for the method to determine the rotor position.

11 Claims, 2 Drawing Sheets

METHOD FOR DETERMINING THE ROTOR POSITION OF A SYNCHRONOUS MOTOR

FIELD OF THE INVENTION

The present invention relates to a method for determining the rotor position of a synchronous motor. Such a method may be necessary, for example, to start a synchronous motor that is monitored by a position-measuring instrument which only delivers unequivocal commutation signals after a reference position has been overtravelled.

BACKGROUND INFORMATION

Numerous methods are conventional by which it is possible to determine the position of the rotor of a synchronous motor in order to permit the electrical commutation of the motor, even without position information from a position-measuring instrument. Many of these methods are based on complicated measurements of the inductances of the primary-circuit coils or the measurement and evaluation of the electromotive counterforce. Such methods make it possible to operate a synchronous motor completely without a position-measuring instrument.

If for the start-up or when putting the synchronous motor into operation, the desire is merely to determine the rotor position, for instance, to determine an offset between the position-measuring instrument and the rotor, or to operate the motor to a reference point, then simpler methods are sufficient for determining the rotor position. Of importance for the operation of a synchronous motor may be actually the position of the vector of the magnetic moment of the rotor, but in simplified terms, the position of the rotor is spoken of in the following.

European Published Patent Application No. 1 085 650 describes a method, according to which initially a first motor phase is energized. Based on the resulting movement direction of the rotor, it is possible to electrically pin down the rotor position to an angular range of 180°. If a second phase which is situated centrally in this range is then energized, the rotor position can be electrically pinned down to an angular range of 90° based on the resulting direction of rotation of the rotor. With each further step, this range is halved, so that the method can be aborted when the desired exactitude has been achieved. A disadvantage in this method, however, is that relatively large movements of the rotor must be brought about before the resulting direction of rotation can be unequivocally detected with the aid of a position-measuring instrument. If these movements are selected to be too small, then grooving forces and machine vibrations can lead to a false result. The rotor position is then no longer correctly detected. However, larger movements are problematic and are not allowed in all cases, for instance, when a synchronous motor is driving a tool that is already engaged with a workpiece. Another disadvantage of this method is that the current necessary for generating a movement of the rotor becomes increasingly greater, the narrower the angular range becomes. Namely, if the magnetic field generated by the current vector is already nearly parallel to the rotor, then, given a constant current, the torque generated becomes increasingly smaller. The accuracy of the method is thus limited by the maximum possible current.

SUMMARY

An example embodiment of the present invention may provide a simple method by which it is possible to determine the rotor position of a synchronous motor.

In certain cases, it may be provided to initially lock the rotor of the synchronous motor using a brake. Such a brake may be available in many applications, for example, in machine tools where, for safety reasons, electrical and mechanical motor brakes are customary for all axes. The holding force of such a brake is great compared to grooving forces of the synchronous motor or forces applied to the rotor by machine vibrations. These effects are therefore insignificant for the subsequent determination of the rotor position. It is thus possible to work with very small deflections of the rotor, which are still allowed even in critical applications. If the synchronous motor is held by a great static friction, even without a brake, then the engagement of a brake may be needless, since the static friction ultimately acts like an engaged brake.

In order to move the rotor of a synchronous motor, a current which generates a magnetic field vector may be generated in the coils of the synchronous motor. The magnetic field provides for a torque at the rotor if the rotor is not magnetically parallel (stable equilibrium) or antiparallel (unstable equilibrium) with respect to the field vector. When a current vector is mentioned in the following, it includes the amount of the impressed current and the direction of the magnetic field generated by the current. All angle specifications specific to the rotor of the synchronous motor relate in the following to one electrical period, i.e., one full rotation of the current vector. In a synchronous motor, one full rotation of the motor shaft may definitely correspond to a plurality of electrical periods.

If with the brake engaged, a plurality of current vectors having a different angular position are applied to the synchronous motor, and for each of these current vectors, the amount is determined that is necessary to attain a small defined deflection of the rotor against the holding force of the brake, a curve shape results having two minima which are arranged, offset in each case by 90°, before and after the sought angle of the rotor position. Thus, the rotor position is already established with the determination of one minimum of the current necessary for attaining a defined deflection, and the motor may be started in controlled fashion if, additionally, the direction of the deflection is taken into consideration in this minimum. This is because a maximum torque is achieved at a constant current when the rotor and current vector are aligned perpendicularly to one another. A required defined deflection is achieved using a minimum current. Conversely, the generated torque is very small at a given current when the current vector and the rotor are nearly parallel or antiparallel. Thus, to attain a defined deflection, a suitably high current may be necessary. However, an example embodiment of the present invention is based precisely on determining the position of the rotor from the angular positions with minimal amount of the current vectors. The measurement of the amount of the current vector necessary for attaining a defined deflection may thus be broken off when the current reaches a limiting value, without the accuracy of the rotor-position determination thereby suffering.

In the first approximation, a force proportional to the deflection is necessary for deflecting a motor held by a brake. This may be attributed, for example, to the elasticity of the shaft with which the rotor and the brake engage. However, the holding force of the brake itself may also be viewed as spring force for very small deflections. A restoring force proportional to the deflection of the rotor or a restoring moment proportional to the deflection results. If one measures the amount of the current vector necessary for attaining a defined deflection, this defined deflection corresponds precisely to a defined torque. Instead of a position-measuring instrument for measuring the deflection of the rotor, the method may also be carried out using a torque sensor by which it is possible to determine the amount and direction of the torque of the synchronous motor. After the current vector has been switched off, the rotor returns to its original position due to the restoring moment.

According to an example embodiment of the present invention, a method for determining a rotor position of a synchronous motor includes: applying a plurality of current vectors to the synchronous motor in different directions; determining an amount of the current vector necessary to attain a defined deflection of the rotor, deflection of the rotor resulting in a restoring torque proportional to the deflection, the rotor returning to an original position by the restoring torque after application of each current vector; and calculating the rotor position from at least one angular position of the current vector, for which an amount of the current vector necessary to attain the desired deflection of the rotor is minimal.

According to an example embodiment of the present invention, a control device for a synchronous motor includes: an arrangement configured to apply a plurality of current vectors to the synchronous motor in different directions; an arrangement configured to determine an amount of the current vector necessary to attain a defined deflection of the rotor, deflection of the rotor resulting in a restoring torque proportional to the deflection, the rotor configured to return to an original position by the restoring torque after application of each current vector; and an arrangement configured to calculate a rotor position from at least one angular position of the current vector, for which an amount of the current vector necessary to attain the desired deflection of the rotor is minimal.

According to an example embodiment of the present invention, a control device for determining a rotor position of a synchronous motor includes: means for applying a plurality of current vectors to the synchronous motor in different directions; means for determining an amount of the current vector necessary to attain a defined deflection of the rotor, deflection of the rotor resulting in a restoring torque proportional to the deflection, the rotor returning to an original position by the restoring torque after application of each current vector; and means for calculating the rotor position from at least one angular position of the current vector, for which an amount of the current vector necessary to attain the desired deflection of the rotor is minimal.

Further aspect and details are set forth below in the following description of an example embodiment with reference to the appended Figures.

DETAILED DESCRIPTION

Figure 1:
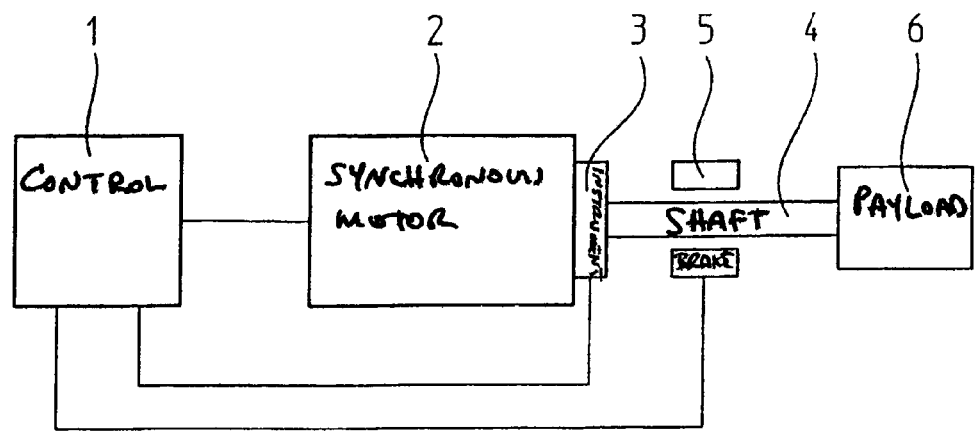
FIG. 1 is a block diagram of a drive unit having a synchronous motor.

FIG. 1 illustrates a drive unit having a synchronous motor 2 that is triggered via a control 1. The rotor position of synchronous motor 2 is monitored via a position-measuring instrument 3 that, for example, may be an incremental rotary transducer that only allows the calculation of absolute position values after a reference point has been overtravelled. Position-measuring instrument 3 is connected to shaft 4 of synchronous motor 2. Since shaft 4 is rigidly connected to the rotor of synchronous motor 2, it is possible to infer the position of the rotor from the position of shaft 4. If necessary, a brake 5 may act upon shaft 4. Such mechanical or electrical brakes 5 may be used to quickly brake movements in case of emergency or to keep suspended axles in the de-energized state. Brake 5 may be activated via control 1. A payload 6 is driven via shaft 4. For example, this may be the tool spindle of a machine tool, or also a linear axle of the machine tool that is driven via a spindle, etc.

Figure 2:
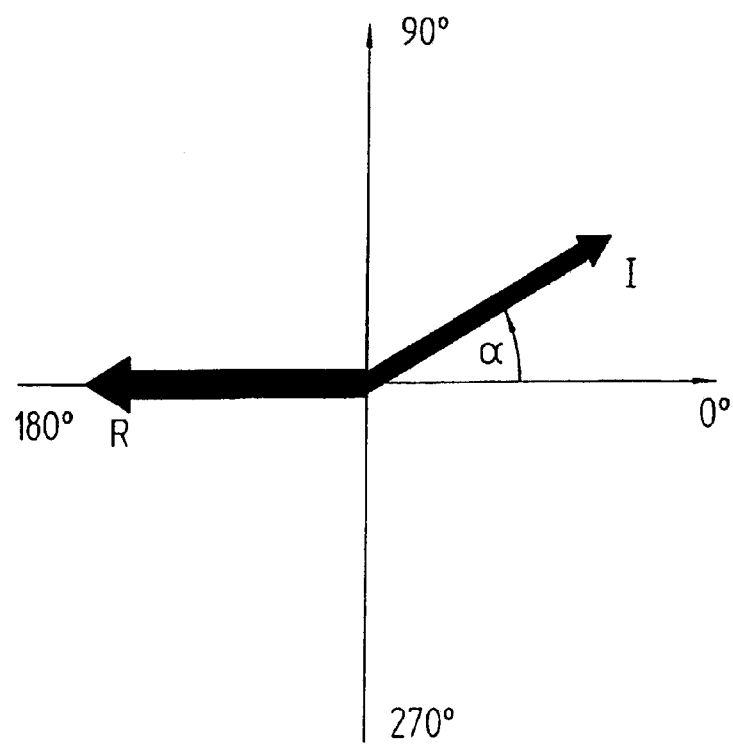
FIG. 2 is a vector diagram with current vector and rotor position.

FIG. 2 is a vector diagram in which rotor R (i.e., the vector of the magnetic moment of rotor R), without restriction of the generality, stands at 180° within an electrical period of the synchronous motor. In the exemplary embodiment described, a current vector I is rotated in steps of five degrees from angle $\alpha=0°$ to $\alpha=355°$. In so doing, for each angular position, the amount of current vector I is determined that is necessary to attain a defined deflection of rotor R. The direction in which the deflection takes place is also registered. This information may be queried by position-measuring instrument 3, in the same manner as the amount of the instantaneous deflection.

In the case illustrated in FIG. 2, rotor R is deflected clockwise, thus in the mathematically negative direction. This holds true for all current vectors I in the angular range $0°<\alpha<180°$. In the range $180°<\alpha<360°$, rotor R is deflected counter-clockwise, thus in the mathematically positive direction.

A few thousandths of a degree may suffice as a defined deflection. Such a small deflection of less than 0.01° may scarcely have a safety-relevant significance, and may even be used when, by this deflection, a tool is moved that is engaged with a workpiece.

Figure 3:
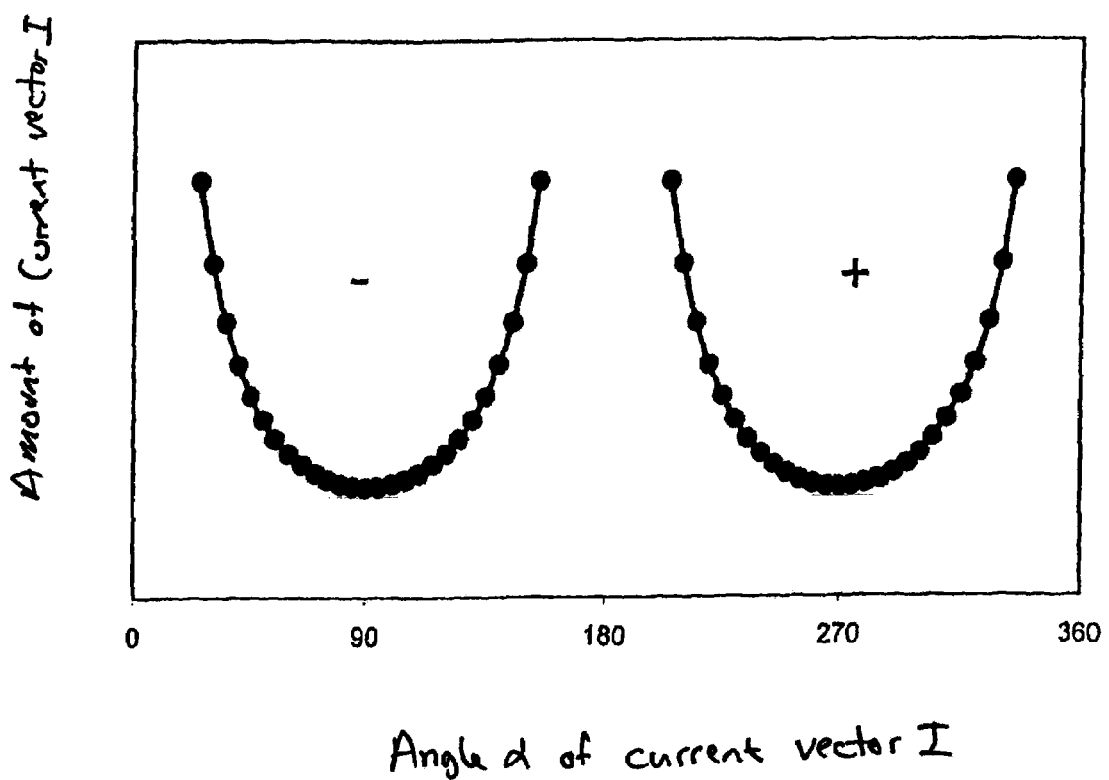
FIG. 3 illustrates the angle-dependent characteristic of the current-vector amount necessary for attaining a small deflection of the rotor.

If one plots the amount of current vector I needed for attaining a defined deflection of rotor R against the angular position of current vector I, one obtains the curve shape illustrated in FIG. 3. Since the resulting torque is a function of the sine of the angle between current vector I and rotor R, and the deflection of rotor R is proportional to the torque, one obtains a curve shape that is proportional to the amount of the reciprocal value of the sine of the angle between current vector I and rotor R. This function has two minima that are arranged, offset by 90°, before and after the sought-after angle of rotor R. In addition, the above-described direction of the deflection of rotor R is indicated with "−" and "+" in FIG. 3.

To determine the rotor position, the position of the minima is ascertained. Already with the knowledge of the position of one of the minima and the direction of the deflection, the position of rotor R is known and it is possible to start synchronous motor 2 in controlled fashion.

To increase the accuracy, taking into account the direction of the deflection, the average value of the angle of one minimum with negative direction of rotation and the succeeding (larger) angle of one minimum with positive direction of rotation is calculated by forming the sum of the two angles and halving it. The resulting angle corresponds to the sought-after position of rotor R within one electrical period. If the direction of the deflection is not taken into consideration, it is possible to obtain as the rotor position, a result shifted by 180° with respect to the actual rotor position.

Based on this result, it is possible to carry out the commutation of synchronous motor 2 in a manner providing a controlled start-up. To this end, it may be sufficient to know the position of rotor R with an accuracy of 10° within an electrical period. If position-measuring instrument 3 reaches a reference position, thus control 1 knows the position of the rotor exactly, then the commutation may be undertaken based on the position data of position-measuring instrument 3.

As illustrated in FIG. 3, in regions in which rotor R and current vector I are nearly parallel or antiparallel, no amounts of current vector I are ascertained. In these regions, a particularly high current is necessary to attain a defined deflection, since the sine of the angle between current vector I and rotor R becomes very small. However, the ascertainment of the amount of current vector I may be broken off as of a limit current without impairing the exactness of the rotor-position determination, since only the determination of the angular position of the minima of the curve shape illustrated in FIG. 3 may be important for calculating the rotor position. For this purpose, it may be sufficient to record a few values in the region of these minima. Thus, the impressed current may remain relatively small.

The method described may be suitable for rotary synchronous motors, the same as for linear synchronous motors. The vector representation of rotor R and current vector I in one electrical period for linear motors does not differ from that of the rotary synchronous motor. The defined deflection in the case of a linear motor is a linear deflection which generates a restoring force. For example, this deflection may be in the range of a few μm, and less than 0.1 mm, so that the method may be usable in safety-related critical applications, as well.

Suitably equipped control 1, a numerical control of a machine tool, for example, may take over the sequencing control for the method described here.

What is claimed is:

1. A method for determining a rotor position of a synchronous motor, comprising:
    applying a plurality of current vectors to the synchronous motor in different directions;
    determining an amount of the current vector necessary to attain a defined deflection of the rotor, deflection of the rotor resulting in a restoring torque proportional to the deflection, the rotor returning to an original position by the restoring torque after application of each current vector; and
    calculating the rotor position from at least one angular position of the current vector, for which an amount of the current vector necessary to attain the desired deflection of the rotor is minimal.

2. The method according to claim 1, further comprising measuring a deflection of the rotor by a position-measuring instrument.

3. The method according to claim 1, wherein the defined deflection of the rotor is less than 0.01° for a rotary synchronous motor.

4. The method according to claim 1, wherein the defined deflection of the rotor is less than 0.1 mm for a linear synchronous motor.

5. The method according to claim 1, wherein the current vectors are distributed uniformly over one electrical period.

6. The method according to claim 5, wherein the current vectors are distributed in steps of less than 10°.

7. The method according to claim 1, wherein the rotor position is calculated in the calculating step as half of a sum of two adjacent angular positions of the current vectors, for which the amount of the current vector necessary to attain the defined deflection of the rotor is minimal.

8. The method according to claim 1, further comprising accounting for a direction of the defined deflection of the rotor to unequivocally determine the rotor position.

9. The method according to claim 1, further comprising initially engaging a brake to hold the rotor of the synchronous motor.

10. A control device for a synchronous motor, comprising:
    an arrangement configured to apply a plurality of current vectors to the synchronous motor in different directions;
    an arrangement configured to determine an amount of the current vector necessary to attain a defined deflection of the rotor, deflection of the rotor resulting in a restoring torque proportional to the deflection, the rotor configured to return to an original position by the restoring torque after application of each current vector; and
    an arrangement configured to calculate a rotor position from at least one angular position of the current vector, for which an amount of the current vector necessary to attain the desired deflection of the rotor is minimal.

11. A control device for determining a rotor position of a synchronous motor, comprising:
    means for applying a plurality of current vectors to the synchronous motor in different directions;
    means for determining an amount of the current vector necessary to attain a defined deflection of the rotor, deflection of the rotor resulting in a restoring torque proportional to the deflection, the rotor returning to an original position by the restoring torque after application of each current vector; and
    means for calculating the rotor position from at least one angular position of the current vector, for which an amount of the current vector necessary to attain the desired deflection of the rotor is minimal.

* * * * *